…

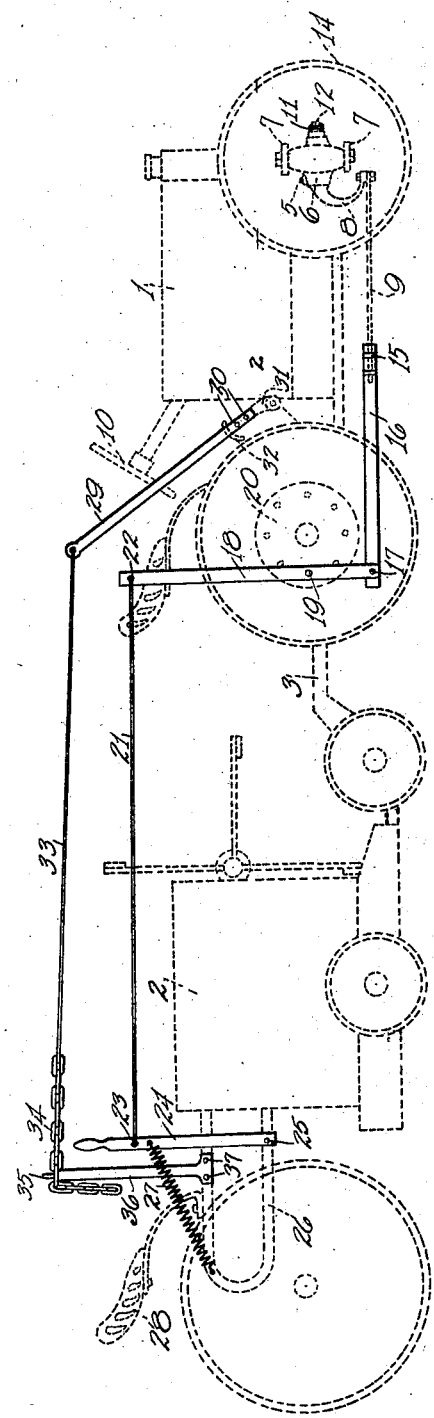

UNITED STATES PATENT OFFICE.

HERMAN P. HAMER, OF SPRING VALLEY, ILLINOIS.

TRACTOR STEERING AND CONTROLLING DEVICE.

1,402,600.  Specification of Letters Patent.  Patented Jan. 3, 1922.

Application filed October 29, 1920. Serial No. 420,441.

*To all whom it may concern:*

Be it known that I, HERMAN P. HAMER, a citizen of the United States, and a resident of Spring Valley, in the county of Bureau and State of Illinois, have invented a new and useful Improvement in Tractor Steering and Controlling Devices, of which the following is a full, clear, and exact description.

My invention relates to improvements in tractor steering and controlling devices, and it consists in the constructions, combinations, and arrangements herein described and claimed.

An object of my invention is to provide a device having means connecting with the steering mechanism of a tractor for guiding the latter from a trailer and having additional means for controlling the clutch mechanism of the tractor from the trailer.

A further object of my invention is to provide a device of the type described having means connecting with the steering mechanism of a tractor to hold the wheels in normal position to insure travel of the vehicle in a straight forward direction.

A further object of my invention is to provide a device of the type described that can be applied to a tractor or the like of an ordinary construction without materially altering the structure of the same.

A further object of my invention is to provide a device of the type described that is simple in construction and operation, inexpensive to manufacture, and thoroughly practical commercially.

Other objects and advantages will appear in the following specification, and the novel features of the invention will be particularly pointed out in the amended claims.

My invention is illustrated in the accompanying drawings forming part of this application, in which—

Figure 1 is a view mainly diagrammatic showing the use and application of the device, Figure 2 is a plan view of a fragmentary portion of the mechanism shown in Figure 1.

Referring now to the drawings, a tractor or other automotive vehicle of an ordinary construction is indicated generally at 1. 2 denotes an article drawn thereby, such as a binder, connection with the tractor being established by a draw bar 3. The tractor 1 is provided with the usual steering mechanism including the steering knuckles 6 and 6' carried at the ends of the front axle 7 connected by a tie rod 5. Radius rods 4—4 are secured to the front axle 7 adjacent the ends thereof in the usual manner, as shown. A steering arm 8 connects with the steering knuckle 6' and is joined by a link 9 to the customary steering gear (not shown), which has an operative connection with the wheel 10. The latter is positioned to be operated from the driver's seat.

The parts described so far are ordinary in construction and form no part of my invention, except in so far as they cooperate with the parts about to be described. In carrying out my invention, I provide a spring 11. One end of the spring 11 is secured at 12 to the forward portion of the steering knuckle 6', while the other end of the spring 11 is secured to the forward end of the remote radius rod, being held thereon by means of a nut 13.

The tension of the spring 11 on the steering knuckle 6' tends to turn the wheels 14—14 to the left. The link 9 is disengaged from the usual steering gear and is clamped at 15 to a rod 16. The rod 16 is pivoted at 17 to a lever 18 fulcrumed at 19 on the axle housing 20. A cable 21 having one end secured at 22 to the upper end of the lever 18 extends to the trailer 2 and is secured at 23 to a lever 24 that is fulcrumed at 25 on the frame 26 of the trailer. A spring 27 connecting the lever 24 with the frame 26 exerts a tension on the lever 24 to maintain the same in vertical position, as shown, thereby counterbalancing the tension of the spring 11. Consequently, the steering knuckles 6 and 6' are normally held in the position shown and the tractor will travel in a straight forward direction.

It will be observed that the lever 24 is positioned adjacent a seat 28 on the trailer and that the upper portion of the lever is adapted to be grasped by the hand. The lever 24 may therefore be moved about its fulcrum away from or toward the seat 28, thereby relaxing the tension on the steering knuckle 6' due to the action of the spring 27 and permitting the tractor to turn to the left in response to the action of the spring 11 or moving the steering knuckle 6' against the action of the spring 11 to guide the tractor to the right.

Since the tractor 1 may be guided from the trailer 2, it is desirable that means be provided for controlling the movement of the tractor from the trailer as well. I therefore provide a bar 29 that is secured rigidly by bolts 30 or the like to the regular clutch lever 31. The clutch lever 31 is ordinarily operated by means of the pedal 32. A cable 33, having its forward end secured to the bar 29 at its upper end, extends to the trailer and is provided with a chain 34 at its rearward end. The bar 29 which forms an extension to the clutch lever 31 may therefore be operated by means of the cable 33 to establish a clutching engagement between the driving mechanism and the wheels of the tractor in the same manner as though the pedal 32 was forced downwardly.

From the foregoing description of the various parts of the device, the operation thereof may be readily understood. The engine of a tractor is started in an ordinary manner. The operator takes his seat on the trailer 2 and operates the clutch lever 31 by slacking the cable 33, thereby "letting in" the clutch and causing the tractor to move forwardly. The clutching mechanism is maintained in inoperative position by hooking a link of the chain 34 over a pin 35 on a support 36 that is secured at 37 to the frame 26. The balanced actions of the springs 11 and 27 will hold the steering knuckles 6 and 6' in position to cause the tractor to move in a straight forward direction until the lever 24 is moved.

The device is simple in construction, can be quickly and easily applied to a tractor, and the article to be drawn without materially altering the ordinary construction of these articles. Likewise the device may be removed and the tractor and the article drawn operated in an ordinary manner.

I claim:

1. The combination with a tractor having a front axle, radius rods connecting with the axle adjacent the ends thereof, and a steering mechanism including steering knuckles carried at the ends of the axle and a steering arm connecting with one of said steering knuckles, of tensional means connecting said last named steering knuckle with the remote radius rod, and means connecting with said steering arm for guiding the movement of the tractor at a distance therefrom, said last named means including tensional means adapted to counterbalance the action of said first named tensional means to cause the tractor to normally travel in a straight line.

2. The combination with a tractor having a front axle, radius rods connecting with the front axle adjacent the ends thereof, a clutch, and a steering mechanism including steering knuckles carried at the ends of the axle and a steering arm connecting with one of said steering knuckles, of means connecting with said clutch for operating the latter at a distance from the tractor, tensional means connecting said indicated steering knuckle with the forward end of the remote radius rod, and means connecting with said steering arm for guiding the movement of the tractor at a distance therefrom, said last named means including tensional means adapted to counterbalance the action of said first named tensional means to cause the tractor to normally travel in a straight line.

HERMAN P. HAMER.